(12) United States Patent
Gortz et al.

(10) Patent No.: US 6,571,933 B1
(45) Date of Patent: Jun. 3, 2003

(54) INDUCTIVE ENERGY TRANSFER SYSTEM

(75) Inventors: Ole Gortz, Virum (DK); Uffe Lykkegaard, Aarhus (DK); Benny Larsen, Hornslet (DK); Aksel Kloster, Brabrand (DK); Knud Erik Glud, Hinnerup (DK); Henrik Duch Simonsen, Skanderborg (DK)

(73) Assignee: Crisplant A/S, Arhus (DK)

( * ) Notice: Subject to any disclaimer, the term of this patent is extended or adjusted under 35 U.S.C. 154(b) by 0 days.

(21) Appl. No.: 09/807,936
(22) PCT Filed: Oct. 20, 1999
(86) PCT No.: PCT/IB99/01717
§ 371 (c)(1),
(2), (4) Date: Nov. 15, 2001
(87) PCT Pub. No.: WO00/23203
PCT Pub. Date: Apr. 27, 2000
(Under 37 CFR 1.47)

(30) Foreign Application Priority Data

Oct. 20, 1998 (DK) .......................... 1998 01346

(51) Int. Cl.⁷ .............................................. B65G 35/00
(52) U.S. Cl. .................................. 198/619; 198/370.06
(58) Field of Search ............................. 198/370.06, 619

(56) References Cited

U.S. PATENT DOCUMENTS

| 4,833,337 A | | 5/1989 | Kelley et al. |
| 5,086,729 A | * | 2/1992 | Katagiri .................. 198/370.06 |
| 5,293,308 A | | 3/1994 | Boys et al. |
| 5,450,305 A | | 9/1995 | Boys et al. |
| 5,528,113 A | | 6/1996 | Boys et al. |
| 5,619,078 A | | 4/1997 | Boys et al. |
| 5,701,992 A | | 12/1997 | Enomoto ................ 198/370.06 |
| 5,709,291 A | | 1/1998 | Nishino et al. |
| 6,005,304 A | | 12/1999 | Seelig |
| 6,253,901 B1 | * | 7/2001 | Hintz et al. ............ 198/370.06 |

FOREIGN PATENT DOCUMENTS

| DE | 4446779 C2 | 12/1999 |
| EP | 0799517 B1 | 10/1997 |
| EP | A1990604 | 4/2000 |
| JP | 3107341 | 5/1991 |
| JP | 5207606 | 8/1993 |
| WO | WO 9217929 | 10/1992 |
| WO | WO 9323908 | 11/1993 |
| WO | WO 9410003 | 5/1994 |
| WO | WO 9620526 | 7/1996 |
| WO | WO 9631381 | 10/1996 |
| WO | WO 9909633 | 2/1999 |

OTHER PUBLICATIONS

Pivnjak et al., "Transportmittel mit induktiver Energieübertragung," Elektrie 34 (1980) H.7, pp. 339–341. ("Means of transportation with inductive energy transfer," English translation of Abstract provided).

* cited by examiner

Primary Examiner—James R. Bidwell
(74) Attorney, Agent, or Firm—Birch, Stewart, Kolasch & Birch, LLP

(57) ABSTRACT

An inductive energy transfer system supplies energy from a stationary primary rail to a number of movable secondary rails each connected to a movable unit. The system is particularly suited for conveyor units of a sorter system, each unit having an article support, the energy provided from the energy transfer system being used primarily for discharging articles from the article-support. The primary rail as well as the secondary rails are provided with legs so that the legs in an operational position are overlapping so as to reduce the losses caused by the air gap between the primary rail and the secondary rails. The movable units are each equipped with an electrical battery for smoothing the load from the movable unit on the primary side of the transfer system.

24 Claims, 2 Drawing Sheets

INDUCTIVE ENERGY TRANSFER SYSTEM

This application is the national phase under 35 U.S.C. § 371 of PCT International Application No. PCT/IB99/01717 which has an International filing date of Oct. 20, 1999, which designated the United States of America and was published in English.

FIELD OF THE INVENTION

The present invention relates to an inductive energy transfer system for supplying energy from a stationary primary rail to a number of movable secondary rails each connected to a movable unit. The system is particularly suited for conveyor units of a sorter system, each unit having article-supporting means, the energy provided from the energy transfer system being used primarily for discharging articles from the article-supporting means.

In particular, the invention relates to a system in which the primary rail as well as the secondary rails are provided with legs so that the legs in an operational position are overlapping so as to reduce the losses caused by the air gap between the primary rail and the secondary rails.

BACKGROUND OF THE INVENTION

It is known from the prior art to transfer energy between a stationary part and one or more movable parts by means of inducting a current in a secondary coil on a movable part with a magnetic field generated by applying an actuating current in a primary coil on the stationary part.

The primary side of known inductive energy transfer systems typically comprises a single conductor that is more or less fully encircled by a rail or screen carrying the secondary coil of the secondary side and formed from a magnetic conductive material. The part carrying the secondary coil may be a ferrite core which is particularly suited as a magnetic conductive material. The supply unit for supplying power to the primary coil is commonly equipped with compensating means for providing compensation for rapidly changes in the loads on the primary coil from the secondary coils.

DESCRIPTION OF THE INVENTION

In order to improve the usefulness of inductive energy transfer, in particularly for systems with minor loads on the primary rail but also applicable to systems with larger loads, it is important the inductive energy transfer system is technically stable and reliable and is economically sound with respect to initial costs, installation as well as in operation.

It is an object of the present invention to provide an inductive energy transfer system in which the losses caused by the air gap between the primary coil and the secondary coil(s) are reduced.

It is a further object of the present invention to provide a system in which the temporal variations in the loads on the primary coil from the secondary coil(s) are reduced.

It is a yet further object of the present invention to provide a system in which the losses in the energy transfer are reduced and the efficiency thus is increased.

These and other objects of the present invention that will become apparent from the following description are fulfilled by means of the invention as disclosed below.

Thus, the present invention concerns a sorter for conveying and sorting articles comprising a guide rail forming a closed loop, a U-shaped primary rail made from a magnetic conducting material and having a primary coil connected to a power supply unit for generating an actuating current in the primary coil, the primary rail being positioned along at least a part of the guide rail, and a plurality of movable units moving along said guide rail, each unit having article-supporting means defining at least one article-supporting surface, means for discharging articles from said surface and a U-shaped secondary rail made from a magnetic conducting material and having a secondary coil, the secondary rail being so positioned during operation that the legs of the primary rail and the legs of the secondary rail overlap over a substantial part of the secondary rail in the direction of motion of the unit, the overlap being of at least twice the distance between the leg in question of the primary rail and the corresponding leg of the secondary rail, the unit having means for using energy inducted in the secondary coil for driving the means for discharging articles.

The overlap is in the embodiment shown in FIG. 1 of about four times the distance between the legs defining the air gap the magnetic flux has to pass. The longer the overlap the lower the losses, but the air gap must from a practical point of view have a minimum size and the length of the overlap is restricted by the length of the legs of the rails. A realistic ratio of the overlap and the air gap is from the practical point of view between 1 and 10, preferably from 2 to 6 with 4 as a suitable level.

The length of the secondary rails in the direction of motion of the unit depends of cause on the size of the units and the spacing between consecutive units but between 0.1 m and 1 m are reasonable for most applications, preferably between 0.15 m and 0.3 m.

It is an advantage that the secondary rails are arranged with a minor gap in the longitudinal direction of the primary rail between consecutive secondary rails so as to improve the efficiency of the system. The secondary rails should therefore cover from 30% to 95% of the primary rail in the longitudinal direction of the primary rail. In preferred embodiments are 50%–65% of the primary rail covered which has proven to be sufficient to ensure a satisfactory efficiency although the efficiency will be further improved if about 95% of the primary rail is covered, which is a maximum from a practical point of view if mutual motion of consecutive secondary rails is to be allowed for.

The present invention may be used to provide power directly from the secondary coil to power consuming devices on the movable units, a so-called direct drive. However, the actuating current in the primary coil may be skewed or disturbed if these devices have a high power consumption resulting in disturbances in the remaining movable units having a secondary coil and possibly to a decrease of efficiency of the energy transfer system.

Thus, in a preferred embodiment of the present invention, the movable units comprise energy storage means for storing energy inducted in the secondary coil, in particular an electric battery but the energy may be stored by means of other storage means, such as one more capacitors. The variable power consumption of the means for discharging articles from the article-supporting surface is in this way smoothened so that the mean energy transfer to a unit when the primary rail and the secondary rail are in an operational position is low, typically a current between 200 and 1000 mA and preferably between 400 mA and 800 mA at a voltage of between 5 VAC and 30 VAC, preferably between 10 VAC and 20 VAC, such as about 16 VAC, which after rectifying becomes a voltage of 12–14 VDC. The smoothening of the power consumption means that the transferred power is low and substantially constant for which reason the energy transfer system may be constructed simple and without means for compensating for rapid changes in the load on the primary side of the system.

According to an alternative embodiment of the invention, two or more units are electrically connected and share a common energy storage means.

The sorter may advantageously comprise a shield made from a non-ferromagnetic, electrically conducting material, the shield substantially encircle the outer of the primary rail at a distance less than the distance between the leg of the primary rail and the corresponding leg of the secondary rail. The shield may closely adjacent to the primary rail and partly or completely in abutting contact with the primary rail. The shield is in a preferred embodiment mainly made from aluminium.

Furthermore, the secondary rail may be provided with a middle leg carrying the secondary coil, the primary coil being in this case arranged so that a first part of at least one winding of the primary coil passes between a first leg of the secondary rail and the middle leg and a second part of the at least one winding carrying the return current of the first part passes between a second leg of the secondary rail and the middle leg.

The primary coil may be arranged within the primary rail and be carried by holding means made from a non-ferromagnetic material.

The article-supporting means of the movable units comprise in a preferred embodiment of the present invention an endless belt defining the article-supporting surface, the belt being movably arranged and having means for moving the belt so as to discharge articles carried by the belt. The means for moving the belt is power supplied by means of the secondary coil. Preferably, the belt is movably arranged in a direction substantially perpendicular to the direction of motion of the unit.

According to an alternative embodiment of the present invention comprise the article-supporting means of the movable units a tray that is arranged so that it may be tilted about an axis that is substantially parallel to the direction of motion of the unit by means of a tilt mechanism that is supplied with power from the secondary coil. Articles supported by the article-supporting surface defined by the tray may thus be discharged in a direction being substantially perpendicular to the direction of motion of the unit.

The power supply unit for generating the actuating current in the primary coil comprises in a preferred embodiment of the present invention means for impressing a pulsed actuating voltage onto the primary coil which forms part of a tuned resonance circuit comprising a capacitor and the power supply unit further comprises means for measuring the magnitude of the generated current in the primary coil and adjusting the pulse-width of the actuating voltage in order to achieve a predetermined magnitude of the generated current.

Alternatively or additionally, the power supply unit may, apart for means for impressing a pulsed actuating voltage onto the primary coil which forms part of a tuned resonance circuit comprising a capacitor, further comprise means for successively changing the frequency of the actuating voltage within a predetermined frequency range and means for determining the temporal relation between the pulses of the actuating voltage and the phase of the generated current so as to determine the resonance frequency of the tuned resonance circuit.

The above-described power supply unit constitutes, when applied to an inductive energy transfer system, an invention in itself. Likewise, the above-described inductive energy transfer system constitutes an invention in itself, whether or not it is applied to a sorter.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF A PREFERRED EMBODIMENT

Figure 1:
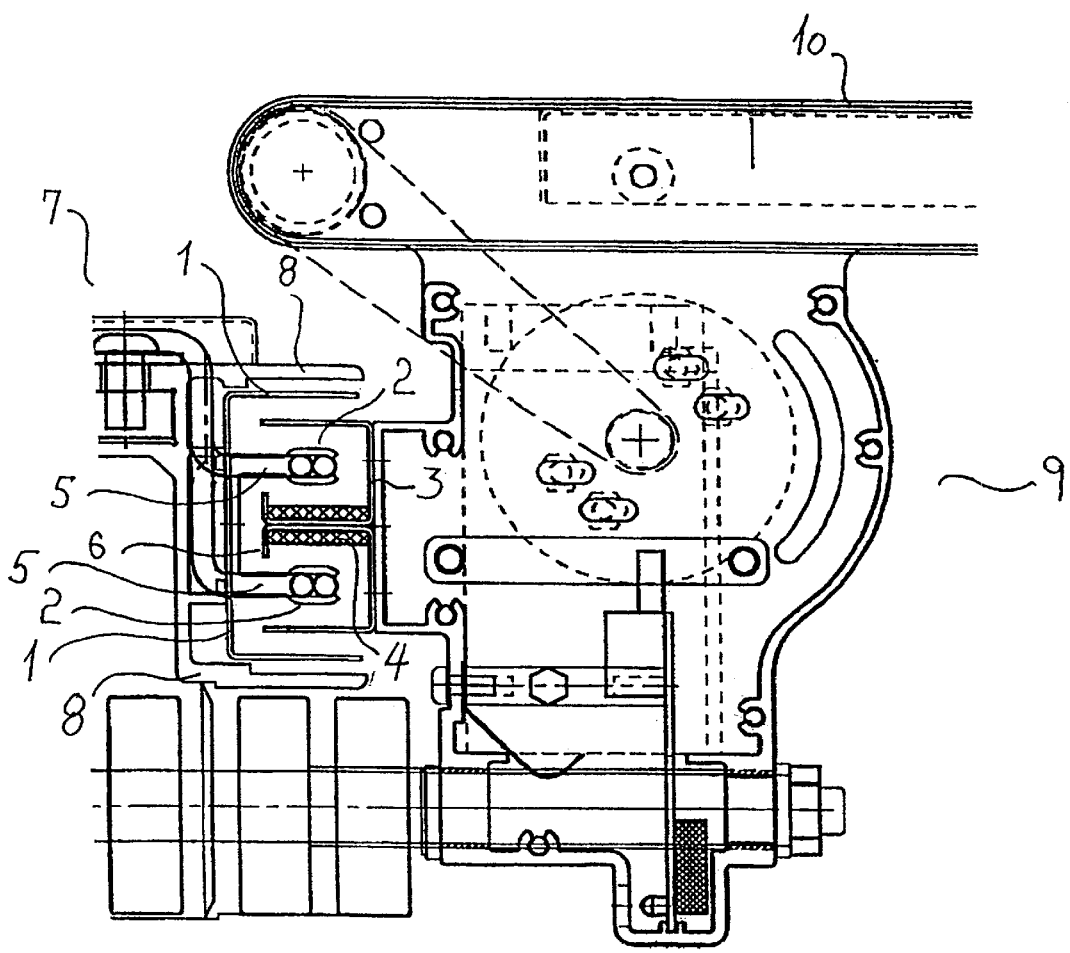
FIG. 1 shows an inductive energy transfer system according to the present invention.

The inductive energy transfer system according to a preferred embodiment of the present invention as shown in FIG. 1 comprises the following three main components:

the primary supply unit (PSU) which is the power supply unit for the primary, stationary rail 1, the primary rail 1 which is a stationary rail carrying the primary side, the primary coil 2, of the inductive system, the secondary rails 3 which are movable rails connected to one of the movable units that receive power from the inductive system, the secondary rails 3 carry the secondary sides 4 of the inductive system.

The PSU is fed with 3×400–500 VAC, 50/60 Hz, which subsequently is rectified and smoothened to 560 VDC. A sinusoidal actuating current of about 22 A RMS at a frequency of approximately 20 kHz is created by means of a pulse-width modulated drive circuit with a constant current generator and capacitor(s) for providing a tuned resonance circuit comprising the capacitor(s), the primary coil and the conductors connecting the part of the circuit comprised in the PSU with the part comprised on the primary side, i.e. the primary coil. A square-pulsed actuating voltage is impressed on the tuned resonance circuit in which a sinusoidal current will be generated if the frequency of the impressed actuating voltage is close to the resonance frequency of the circuit. The magnitude of the current is measured and the pulse-width is adjusted in order to keep a constant current irrespectively of the load on the circuit. The current is led from the PSU via shielded conductors to the primary side 2 of the inductive system. The PSU is arranged so that the length of the conductors from the PSU to the primary side is minimised, preferably to a length of or below 1.5 meter, in order to minimise electromagnetic noise The frequency of the impressed voltage is at start-up of the system swept from 16 to 22 kHz in order to find the correct resonance frequency of the tuned resonance circuit.

This frequency may be different for the different circuit due to different set-up, length of the primary rail and coil, length of conductors etc. The resonance frequency is found when the voltage pulses are in temporal coincidence with the actuating current's passage of zero current. The frequency of the impressed voltage is fine-tuned at regular intervals, e.g. every 100 milliseconds, in order to compensate for variations of the resonance frequency of the circuit due to variation in the load on the circuit because the units connecting to the primary coil have a varying power consumption, in particular if the system of the present invention is used for conveying heavier articles or the system is used to supply power to units that are arranged in trains of units with a possible large spatial distance between consecutive trains so that the primary coil at a given time only connects with a few units or no units at all.

The actual implementation of the above-described Power Supply Unit will be apparent to the person skilled in the art and is for that reason not disclosed in details in the present description.

The losses in the primary circuit are decreased and the efficiency thereby increased by impressing the voltage at the resonance frequency of the primary circuit. Thereby, the usage of e.g. less expensive materials with higher losses or the usage of other solutions that imply losses is allowable without resulting in an overall efficiency of the system being unacceptably low. The primary side of the system may also be formed without the use of capacitors so that no tuned resonance circuit is formed but the current will not become sinusoidal thus generating electromagnetic noise.

The primary rail 1 is formed as a U-rail and is made from 1 mm silicon-containing transformer steel-plate. The length of the legs of the U perpendicular to the direction of motion is 28.5 mm. Along the rail is mounted a profile 5 of a non-ferromagnetic material, such as an extruded or injection moulded plastic material, which carries the primary coil 2. The primary coil 2 is made from a copper conductor of a 6 square millimetre circular cross-section that forms two serial windings coupled to the PSU. The two windings may alternatively be arranged as parallel windings but demand in that case a higher current and thus higher losses than serial windings. Conductors of a circular cross-section are preferred over the more common choice of a flat conductor with a rectangular cross-section because they are more easy to mount in a primary rail. However, the flat conductor utilises the cross-sectional area of the conductor more efficient because the Kelvin skin effect is less pronounced than for conductors of a circular cross-section. The secondary rail may also on average over the area move closer to the area of a flat conductor and thereby reduce the air gap losses. A lower current and thereby lower losses may be applied by using two windings instead of one and the usage of two circular conductors arranged side by side allows for a more compact design than one, larger circular conductor. Furthermore, the Kelvin skin effect is lower for two windings of a smaller cross-sectional area than one winding of a higher cross-sectional area and the two windings may be arranged so that a secondary rail may on average over the area move closer to the cross-sectional area of the two windings and thereby reduce the air gap loss.

The secondary rails 3 has a length in the direction of motion of 220 mm and comprises each two U-rails made from 1 mm silicon-containing transformer steel-plate mounted together forming an E of which the legs are of a length of 23.5 mm in a direction perpendicular to the direction of motion. The height of the E is 65 mm. The middle leg of the E carries the secondary coil 4 which comprises 25 windings made from a copper conductor of a diameter of 0.56 mm. The secondary coil is connected to a cart controller board (CCB). The legs of the U-rails placed in the middle of the E are further equipped with a bend 6 so as to increase the face area of the plate forming the legs and the primary rail 1 through which area the magnetic field travels between the middle leg and the primary rail 1, thus decreasing the magnetic resistance in the system and increasing the efficiency of the system. It is not, due to the presence of the battery, required to include a capacitor in the secondary circuit comprising the secondary coil for forming a tuned resonance circuit, because the battery smoothens the load on the secondary circuit as well as the primary circuit comprising the primary coil.

The primary rail 1 is mounted on the guide rail 7 of the sorter. The guide rail 7 is made from aluminium and the guide rail is at the mounting position formed so as to provide a U-shaped shield 8 around the primary rail. This shield B of a non-ferromagnetic but electrically conducting material, in this case aluminium, increases the efficiency of the energy transfer system by restricting the spreading of the induced magnetic field away from the primary rail 1.

If the primary coil 2 is fed with the voltage U1 having the frequency f, the primary current will create an alternating magnetic field $\phi 1$ around the primary coil 2 and in the primary rail 1. This alternating field will also go through the secondary rail 3 and the secondary coil 4 when the secondary coil 4 is in its operational position relative to the primary rail 1. The alternating field is hereby inducting a secondary voltage U2 in the secondary coil 4, the secondary voltage being in opposition to the voltage U1 of the primary coil 2. The secondary voltage U2 is rectified in the CCB and is fed via a charge circuit on the CCB to a 12 V battery on the movable unit 9. The power from the battery is primarily used to drive a cross-belt 10 on the movable unit 9 for loading an article onto the belt 10 or for discharging article carried on the belt 10, or it may be used for activating a tilt mechanism to tilt a tray, thus discharging an article carried on the tray. The power may also be used for other purposes, such as for driving a control unit controlling the discharge of articles, an antenna for reading radio frequency tags (RFID) on the articles, etc.

The primary rail 1 comprising the primary coil 2 is only arranged along straight sections of the guide rail 7 of the sorter. The length of each primary rail 1 is chosen to be about 15 m and each primary rail 1 has one PSU associated with it. The number of primary rails 1 on a sorter is given by the number of groups of loading stations alternating with groups of discharge stations along the path of the sorter since power primarily is used for loading and/or discharging articles. The total length of the sorter plays only a minor role when the number of primary rails 1 is to be decided since the stand-by power consumption of the units is low.

Each length of the primary rail 1 of 15 m is divided into sub-lengths of 0.5 m without electrical contact between consecutive sub-lengths in order to delimit the eddy current losses in the primary rail 1. Any division of the rail into sub-lengths, such as lengths of. 0.05 m to 3 m, will reduce the losses and the preferred range of 0.25 m to 1 m is selected from a practical and mechanical point of view. The rail may advantageously with respect to the losses be divided into even smaller parts, such as lengths of 0.1–0.3 m.

Choice of Frequency

The present inductive energy transfer system according to the invention has an air gap between the primary and the secondary side and the magnetic flux $\phi$ must pass this air gap. The magnetic induction B is inversely proportional to the distance between the primary side and the secondary side. According to the transformer equation this may be compensated by increasing the frequency f. A number of experiments have been conducted in the frequency range from 2 kHz to 20 kHz and the latter frequency was chosen from a demand of minimal acoustic noise level for working environment considerations. A similar efficiency may be achieved at a lower frequency but the acoustic noise may constitute an environmental problem in that case. The chosen frequency requires shielding of the conductors between the PSU and the primary rail in order to prevent electromagnetic noise from affecting electronic equipment and the personnel. However, the chosen frequency requires that the actuating current in the primary circuit is very close to be a perfect sinusoidal function in order to avoid the generation of electromagnetic noise.

Material for the Rails

The rails 1, 3 have been made from 1 mm transformer plate instead of a laminate of a number of 0.3 mm or 0.5 mm plate which is commonly used in transformers and which causes less eddy-current losses. That solution would be much more mechanically complex to manufacture due to the number of plates to be bend into shape as well as more vulnerable, and the more stable solution with 1 mm plate was chosen. The employed plate contains about 3% silicon which increases the ohmic resistance of the steel thus reducing the eddy-current losses. The plates are annealed at 820° C. for an hour after being bend into shape to form primary and secondary rails whereby the magnetic hysteresis losses in the rails are reduced, primarily at the corners of the rails. The annealing process does not affect the eddy current losses substantially.

The use of powder cores with iron powder and an isolating binder or a ferrite core instead of the plate would reduce the eddy-current losses drastically but these solutions are much more expensive and especially the powder cores are much more mechanically vulnerable. Likewise are iron-nickel alloys much more expensive than transformer steel-plates.

Figure 2:
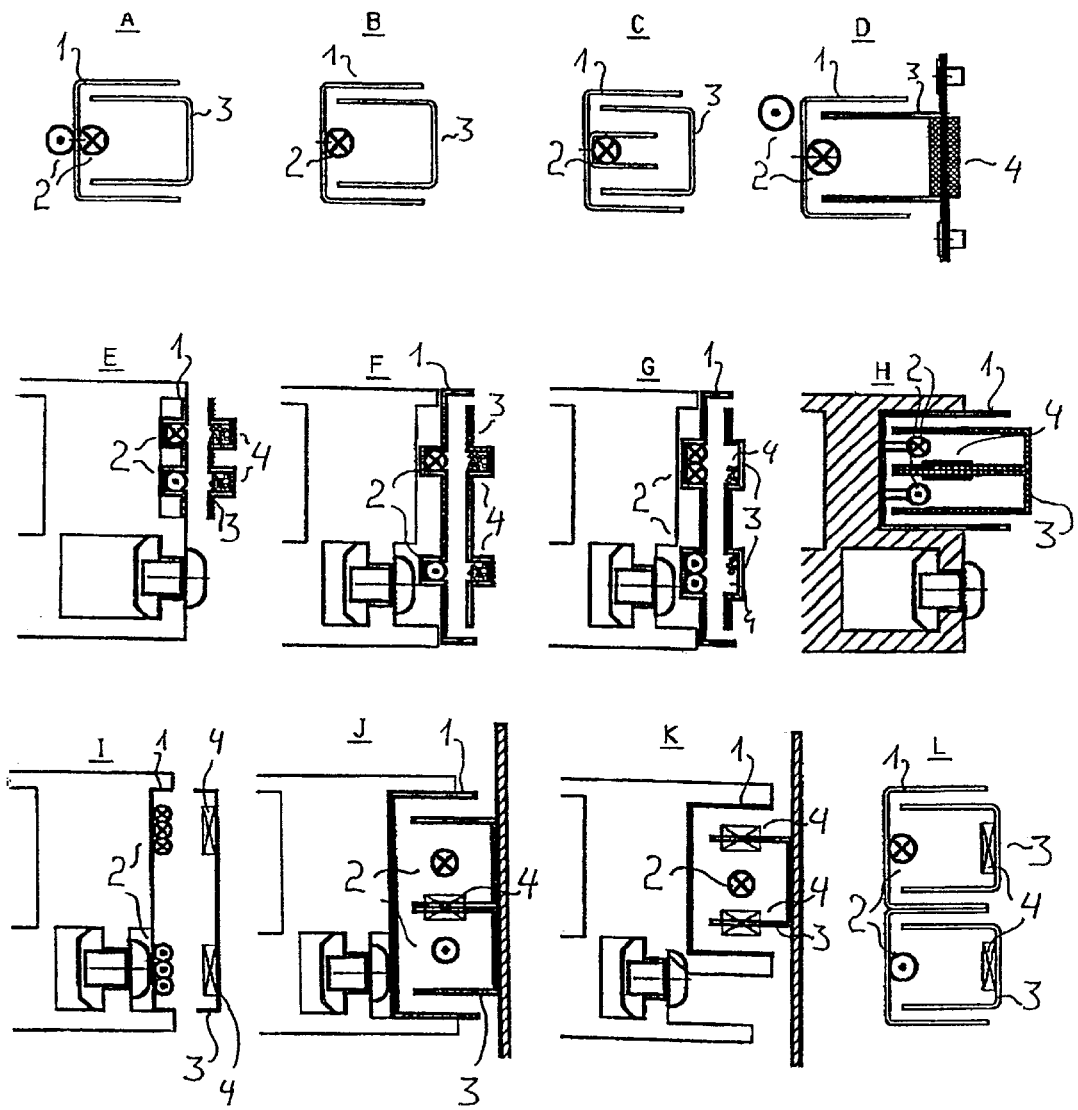
FIGS. 2A–L show alternate configurations of primary and secondary sides of an inductive energy transfer system of the present invention.

A number of alternative configurations of primary and secondary sides of an inductive energy transfer system are shown in FIGS. 2 A–L. The primary rail 1, the primary coil 2, the secondary rail 3 and the secondary coil 4 are indicated on the figures. In some of the embodiments (B, C and K), the guide rail is used for conducting the return current from the primary coil 2 for which reason only one primary conductor is shown on the respective figures.

The present invention also relates to a system for inductive energy transfer as such which may be used for a sorter or may be applied to other devices in which inductive energy transfer is a suitable method of transferring energy from one primary system to one or more secondary systems in which the secondary systems may move relatively to the primary system. Furthermore, the present invention also relates to the disclosed Power Supply Unit applied to an inductive energy transfer system as such.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sorter for conveying and sorting articles comprising:
   a guide rail forming a closed loop,
   a U-shaped primary rail made from a magnetic conducting material and having a primary coil connected to a power supply unit for generating an actuating current in the primary coil, the primary rail being positioned along at least a part of the guide rail, and
   a plurality of movable units moving along said guide rail, each unit having article-supporting means defining at least one article-supporting surface, means for discharging articles from said surface and a U-shaped secondary rail made from a magnetic conducting material and having a secondary coil, the secondary rail being so positioned during operation that, over a substantial part of the secondary rail in the direction of motion of the unit, the legs of the primary rail and the legs of the secondary rail overlap perpendicularly to the direction of motion, the overlap being of at least twice the distance between the leg in question of the primary rail and the corresponding leg of the secondary rail, the unit having means for using energy inducted in the secondary coil for driving the means for discharging articles.

2. The sorter according to claim 1, wherein the movable units comprise energy storage means for storing energy inducted in the secondary coil.

3. The sorter according to claim 2, wherein the storage means comprises a battery.

4. The sorter according to claim 1, comprising a shield made from a non-ferromagnetic, electrically conducting material, the shield substantially encircles the outer of the primary rail at a distance less than the distance between the leg of the primary rail and the corresponding leg of the secondary rail.

5. The sorter according to claim 4, wherein the shield mainly is made from aluminium.

6. The sorter according to claim 1, wherein the secondary rail is provided with a middle leg carrying the secondary coil, the primary coil being arranged so that a first part of at least one winding of the primary coil passes between a first leg of the secondary rail and the middle leg and a second part of the at least one winding carrying the return current of the first part passes between a second leg of the secondary rail and the middle leg.

7. The sorter according to claim 1, wherein the primary coil is arranged within the primary rail and is carried by holding means made from a non-ferromagnetic material.

8. The sorter according to claim 1, wherein the article-supporting means of the movable units comprises an endless belt defining the article-supporting surface, the belt being movably arranged and having means for moving the belt so as to discharge articles carried by the belt.

9. The sorter according to claim 8, wherein the belt is movably arranged in a direction substantially perpendicular to the direction of motion of the unit.

10. The sorter according to claim 1, wherein the power supply unit comprises means for impressing a pulsed actuating voltage onto the primary coil which forms part of a tuned resonance circuit comprising a capacitor and the power supply unit further comprises means for measuring the magnitude of the generated current in the primary coil and adjusting the pulse-width of the actuating voltage in order to achieve a predetermined magnitude of the generated current.

11. The sorter according to claim 1, wherein the power supply unit comprises means for impressing a pulsed actuating voltage onto the primary coil which forms part of a tuned resonance circuit comprising a capacitor and the power supply unit further comprises means for successively changing the frequency of the actuating voltage within a predetermined frequency range and means for determining the temporal relation between the pulses of the actuating voltage and the phase of the generated current so as to determine the resonance frequency of the tuned resonance circuit.

12. A system for inductive energy transfer comprising:
   a U-shaped primary rail made from a magnetic conducting material and having a primary coil connected to a power supply unit for generating an actuating current in the primary coil, and
   a plurality of movable units each having a U-shaped secondary rail made from a magnetic conducting material and having a secondary coil, the secondary rail being so positioned during operation that, over a substantial part of the secondary rail in the direction of motion of the unit, the legs of the primary rail and the legs of the secondary rail overlap perpendicularly to the direction of motion, the overlap being of at least twice the distance between the leg in question of the primary rail and the corresponding leg of the secondary rail.

13. The system according to claim 12, wherein the movable units comprise energy storage means for storing energy inducted in the secondary coil.

14. The system according to claim 13, wherein the storage means comprises a battery.

15. The system according to claim 12, comprising a shield made from a non-ferromagnetic, electrically conducting material, the shield substantially encircles the outer of the primary rail at a distance less than the distance between the leg of the primary rail and the corresponding leg of the secondary rail.

16. The system according to claim 15, wherein the shield mainly is made from aluminium.

17. The system according to claim 12, wherein the secondary rail is provided with a middle leg carrying the secondary coil, the primary coil being arranged so that a first part of at least one winding of the primary coil passes between a first leg of the secondary rail and the middle leg and a second part of the at least one winding carrying the return current of the first part passes between a second leg of the secondary rail and the middle leg.

18. The system according to claim 12, wherein the primary coil is arranged within the primary rail and is carried by holding means made from a non-ferromagnetic material.

19. The system according to claim 12, wherein the power supply unit comprises means for impressing a pulsed actuating voltage onto the primary coil which forms part of a tuned resonance circuit comprising a capacitor and the power supply unit further comprises means for measuring the magnitude of the generated current in the primary coil and adjusting the pulse-width of the actuating voltage in order to achieve a predetermined magnitude of the generated current.

20. The system according to claim 12, wherein the power supply unit comprises means for impressing a pulsed actuating voltage onto the primary coil which forms part of a tuned resonance circuit comprising a capacitor and the power supply unit further comprises means for successively changing the frequency of the actuating voltage within a predetermined frequency range and means for determining the temporal relation between the pulses of the actuating voltage and the phase of the generated current so as to determine the resonance frequency of the tuned resonance circuit.

21. A system for inductive energy transfer comprising:
   a primary coil connected to a power supply unit for generating an actuating current in the primary coil, and
   a plurality of movable units each having a secondary coil,
   wherein the power supply unit comprises means for impressing a pulsed actuating voltage onto the primary coil which forms part of a tuned resonance circuit comprising a capacitor and the power supply unit further comprises means for measuring the magnitude of the generated current in the primary coil and adjusting the pulse-width of the actuating voltage in order to achieve a predetermined magnitude of the generated current.

22. The system according to claim 21, wherein the power supply unit further comprises means for successively changing the frequency of the actuating voltage within a predetermined frequency range and means for determining the temporal relation between the pulses of the actuating voltage and the phase of the generated current so as to determine the resonance frequency of the tuned resonance circuit.

23. The system according to claim 21, wherein the movable units comprise energy storage means for storing energy inducted in the secondary coil.

24. The system according to claim 23, wherein the storage means comprises a battery.

* * * * *